United States Patent [19]

Kawaguchi et al.

[11] Patent Number: 5,752,770
[45] Date of Patent: May 19, 1998

[54] BARREL FOR A TWIN SCREW EXTRUDER WITH AN ABRASION RESISTANT LAYER

[75] Inventors: Naotaka Kawaguchi; Kyoichi Sasaki, both of Numazu, Japan

[73] Assignee: Toshiba Kikai Kabushiki Kaisha, Tokyo-to, Japan

[21] Appl. No.: 701,424

[22] Filed: Aug. 22, 1996

[30] Foreign Application Priority Data

Aug. 23, 1995 [JP] Japan .................... 7-214953

[51] Int. Cl.$^6$ .................... B29B 7/48; B29B 7/58
[52] U.S. Cl. .................... 366/85
[58] Field of Search .................... 366/79, 69, 83–85, 366/88, 89, 297, 300, 301, 318, 349; 425/204, 208, 209; 428/553–558

[56] References Cited

U.S. PATENT DOCUMENTS

| | | | |
|---|---|---|---|
| 3,804,382 | 4/1974 | Pultz | 366/83 X |
| 3,900,788 | 8/1975 | Seufert | 366/79 X |
| 4,028,027 | 6/1977 | Worz | 100/146 X |
| 4,036,540 | 7/1977 | Seufert | 366/83 X |
| 4,117,583 | 10/1978 | Gnadig et al. | 366/83 X |
| 4,133,460 | 1/1979 | Jerpbak | 366/79 X |
| 4,364,664 | 12/1982 | Theysohn | 366/84 |
| 4,383,764 | 5/1983 | Sloin | 366/75 |
| 4,385,876 | 5/1983 | Scherping et al. | 366/85 X |
| 4,519,713 | 5/1985 | Godsey et al. | 366/349 X |
| 4,640,672 | 2/1987 | Ellwood | 366/79 X |
| 4,746,220 | 5/1988 | Sukai et al. | 366/79 |
| 5,110,284 | 5/1992 | Dienst et al. | 366/83 X |
| 5,116,135 | 5/1992 | Kaiser et al. | 366/84 X |
| 5,209,937 | 5/1993 | Kangas | 425/204 X |
| 5,223,345 | 6/1993 | Kaiser et al. | 428/557 |
| 5,352,539 | 10/1994 | Psiuk | 425/208 X |

*Primary Examiner*—Charles E. Cooley
*Attorney, Agent, or Firm*—Cushman Darby & Cushman IP Group of Pillsbury Madison & Sutro LLP

[57] ABSTRACT

A barrel for a twin screw extruder having a pair of helical screws has a barrel body provided with a pair of partly overlapping cylindrical bores, and the pair of helical screws are rotatably supported in the pair of cylindrical bores of the barrel to mix and extrude a molding material. An abrasion resistant layer is formed in at least portions of the surfaces of the pair of cylindrical bores extending in the vicinity of at least one of the two lines of intersection of the pair of partly overlapping cylindrical bores. The abrasion resistance of the abrasion resistant layer has a maximum in a portion thereof around the line of intersection of the pair of cylindrical bores and decreases gradually with distance from the line of intersection. The abrasion resistant layer is formed by depositing a material containing a hard substance by build-up welding, and the hard substance content of the material in the abrasion resistant layer is varied with distance from the line of intersection. The abrasion resistant layer is formed by depositing a material consisting of a corrosion resistant base alloy and a hard substance. The abrasion resistant layer may be formed on a corrosion resistant layer formed over the entire surfaces of the pair of cylindrical bores.

5 Claims, 4 Drawing Sheets

BARREL FOR A TWIN SCREW EXTRUDER WITH AN ABRASION RESISTANT LAYER

BACKGROUND OF THE INVENTION

1. Field of the Invention

The present invention relates to a barrel for a twin screw extruder and, more specifically to a barrel for a twin screw extruder, provided with an abrasion resistant layer on a portion of the inner surface thereof subject to relatively intensive abrading actions to improve the abrasion resistance of the same portion of the inner surface, and capable of reducing residual stress, of securing a stress relaxing layer and of reducing the cost.

2. Description of the Related Art

A barrel for a twin screw extruder has a barrel body provided with a pair of partly overlapping cylindrical bores. A pair of helical screws are supported for rotation in the pair of cylindrical bores, respectively. The pair of helical screws are rotated in the pair of cylindrical bores to mix and extrude a molding material fed into the barrel. Twin screw extruders are classified into those in which a pair of helical screws rotate in opposite directions, respectively, and those in which a pair of helical screws rotate in the same direction.

The surfaces of the pair of cylindrical bores of the barrel body are subject to intensive abrading actions and various measures have been taken to suppress the abrasion of the surfaces of the cylindrical bores. For instance, an abrasion resistant layer is formed in or over the entire inner surfaces of the cylindrical bores of the barrel body by carburizing, nitriding, metallizing or centrifugal casting to improve the abrasion resistance of the inner surfaces.

In some cases, stress is induced in the interface between the inner surfaces of the cylindrical bores of the barrel body and the abrasion resistant layer formed by the aforesaid process when the abrasion resistant layer is formed uniformly in or over the entire surfaces of the cylindrical bores, the inner surfaces of the cylindrical bores have no stress relaxing portion and, consequently, there is a possibility that the barrel body is damaged by cracking or chipping. Since the abrasion resistant layer formed by carburizing or nitriding has a relatively small thickness, the abrasion resistant layer is abraded in a relatively short working period and, once the abrasion resistant layer is abraded, the surfaces of the cylindrical bores are abraded rapidly.

Generally, the thermal conductivities of hard substances, such as carbides, nitrides, borides and oxides, are lower than those of steels. Therefore, the abrasion resistant layer of such a hard substance has a low thermal conductivity. Consequently, heat generated in the molding material during process by shear force exerted on the molding material by the helical screws cannot quickly be dissipated and hence a cooling system for cooling the barrel is unable to function efficiently. If excessive heat is accumulated in the barrel, there is a possibility that the molding material is burnt and defective products, such as products having burn marks, are produced.

SUMMARY OF THE INVENTION

The present invention has been made in view of the foregoing problems and it is therefore an object of the present invention to provide a barrel for a twin screw extruder, having a barrel body provided with a pair of partly overlapping cylindrical bores, and an abrasion resistant layer in portions of the surfaces of the cylindrical bores to be subjected to relatively intensive abrading actions to improve the abrasion resistance of the same portions of the surfaces of the cylindrical bores, and capable of reducing residual stress, of securing a stress relaxing layer and of reducing the cost.

According to a first aspect of the present invention, a barrel has a barrel body provided with a pair of partly overlapping cylindrical bores, for a twin screw extruder having a pair of helical screws rotatably supported in the pair of cylindrical bores of the barrel to mix and extrude a molding material, wherein an abrasion resistant layer is formed in at least portions of the surfaces of the pair of cylindrical bores extending in the vicinity of at least one of the two lines of intersection of the pair of partly overlapping cylindrical bores.

The abrasion resistance of the abrasion resistant layer may have a maximum in a portion thereof around the line of intersection of the pair of partly overlapping cylindrical bores and may decrease gradually with distance in a circumferential direction from the line of intersection.

The abrasion resistant layer may be formed by depositing a material containing a hard substance by build-up welding, and the hard substance content of the material in the abrasion resistant layer may be varied with distance in a circumferential direction from the line of intersection. Such an abrasion resistant layer is less liable to peel off and enhances the abrasion resistance of the surfaces of the cylindrical bores of the barrel.

The abrasion resistant layer may be formed by depositing a material consisting of a corrosion resistant base alloy and a hard substance.

The abrasion resistant layer containing the hard substance may be formed on a corrosion resistant layer of the base alloy formed over the entire surfaces of the pair of cylindrical bores. The abrasion resistant layer and the corrosion resistant layer enhance the corrosion resistance of the surfaces of the cylindrical bores of the barrel.

Preferred embodiments of the present invention will become understood from the following detailed description referring to the accompanying drawings.

DETAILED DESCRIPTION OF THE PREFERRED EMBODIMENTS

Figure 1:
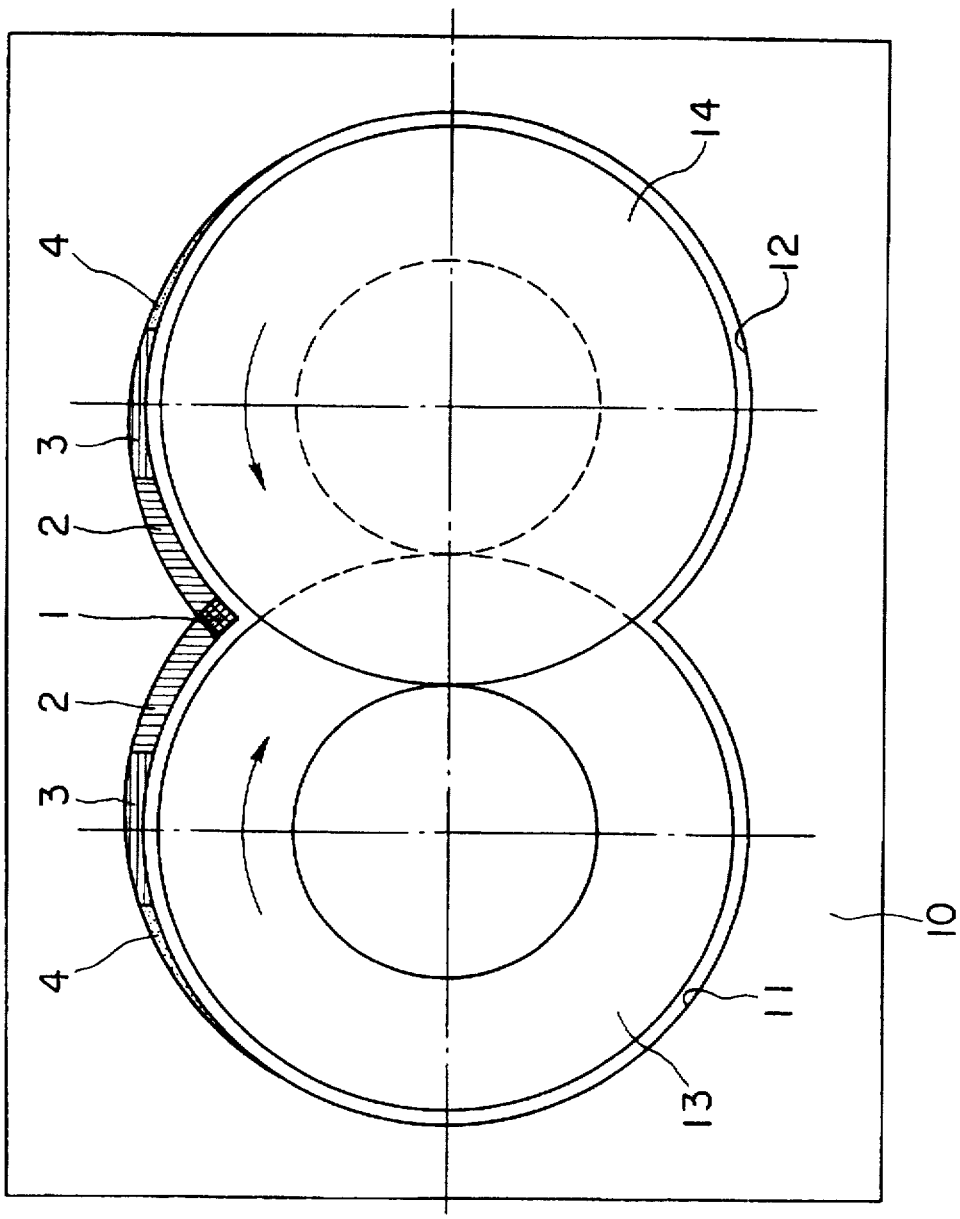
FIG. 1 is a sectional view of a barrel in a first embodiment according to the present invention for a twin screw extruder.
Figure 2:
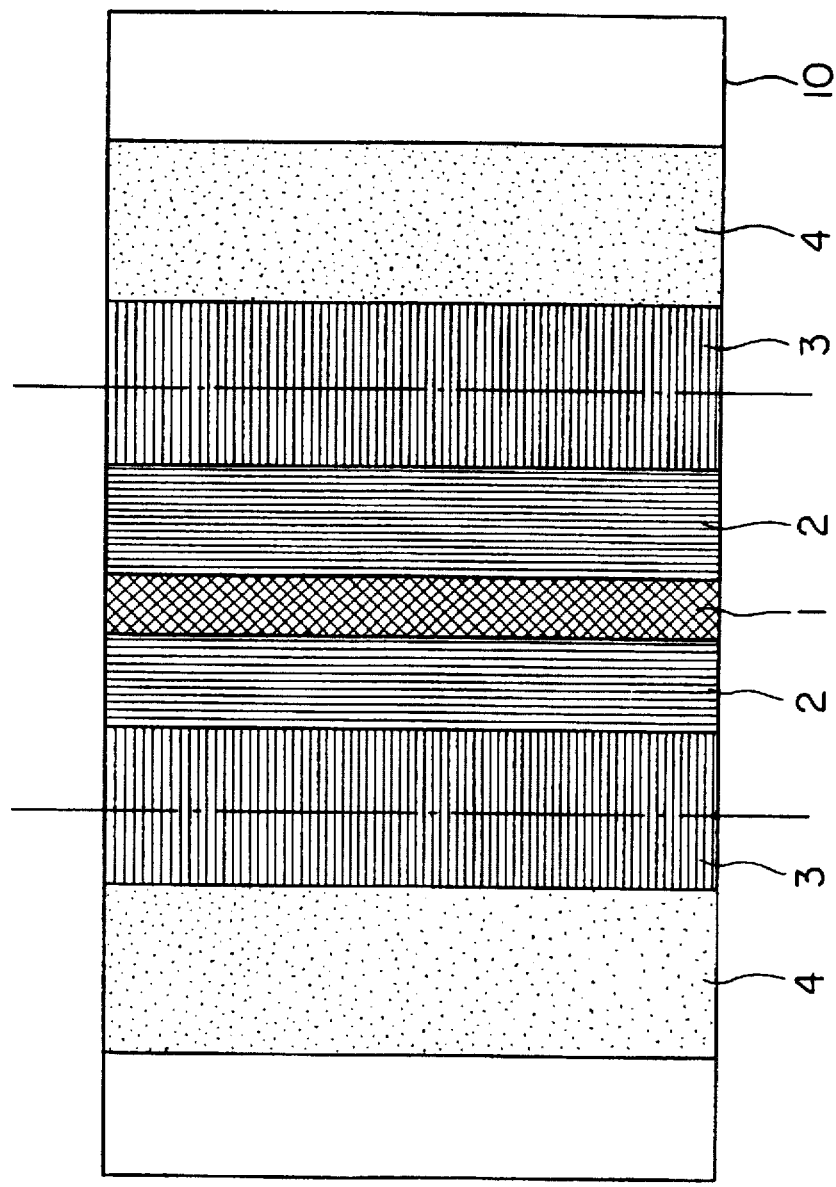
FIG. 2 is a development of the inner surface of the barrel of FIG. 1.

Referring to FIGS. 1 and 2 showing a barrel in a first embodiment according to the present invention for a twin screw extruder, the barrel has a barrel body 10 provided with two partly overlapping cylindrical bores 11 and 12. Two helical screws 13 and 14 are rotatably supported in the two cylindrical bores 11 and 12, respectively. The two helical screws 13 and 14 are rotated to mix a molding material fed into the barrel body 10 and to extrude the mixed molding material from the barrel body 10. The helical screws 13 and 14 may be rotated in the opposite directions as indicated by the arrows, respectively, or in the same direction.

When the helical screws 13 and 14 are rotated in the direction of the arrows, respectively, to mix the molding material, the pressure of the molding material acts most intensively on portions of the surfaces of the bores 11 and 12 against which the mixed molding material is pressed, i.e., portions of the surfaces of the bores 11 and 12 extending along and in the vicinity of an upper line of intersection (as viewed in FIG. 1) of the two partly overlapping cylindrical bores 11 and 12. The magnitude of the pressure acting on those portions decreases with distance from the upper line of intersection of the partly overlapping cylindrical bores 11 and 12.

An abrasion resistant layer 1 is formed in narrow portions of the surfaces of the cylindrical bores 11 and 12 around the upper line of intersection, and abrasion resistant layers 2, 3 and 4 are arranged in that order along the circumferences of the bores 11 and 12 in portions of the surfaces of the bores 11 and 12 extending away from the narrow portions in which the abrasion resistant layer 1 is formed. The abrasion resistant layer 1 has the highest abrasion resistance, and the abrasion resistances of the abrasion resistant layers 2, 3 and 4 are graded in decreasing order of the abrasion resistant layers 2, 3 and 4 with distance from the abrasion resistant layer 1. In this embodiment, the abrasion resistant layers 1, 2, 3 and 4 are formed by build-up welding. The highest pressure acts on the portions of the surfaces of the cylindrical bores 11 and 12 in which the abrasion resistant layer 1 is formed, and the magnitudes of the pressures acting on the portions of the same surfaces in which the abrasion resistant layers 2, 3 and 4 are formed decreases in the order of the abrasion resistant layers 2, 3 and 4. The materials of the abrasion resistant layers 1, 2, 3 and 4 are determined selectively according to the pressures that may act on the abrasion resistant layers 1, 2, 3 and 4, respectively.

For example, the hard substance contents of the materials forming the abrasion resistant layers 1, 2, 3 and 4 are graded in decreasing order of the abrasion resistant layers 1, 2, 3 and 4. The abrasion resistant layers 1, 2, 3 and 4 are characterized by high abrasion resistance, high toughness and abrasion resistance, high toughness, and abrasion resistance, respectively. More concretely, the abrasion resistant layers 1, 2, 3 and 4 are formed by depositing materials respectively having different hard substance contents by build-up welding. The abrasion resistant layer 4 may be formed by depositing a material not containing any hard substance by build-up welding.

The abrasion resistant layers 1 to 4 formed in the portions of the surfaces of the cylindrical bores 11 and 12 which are subjected to relatively intensive abrading actions improve the durability of the surfaces of the cylindrical bores 11 and 12, reduce residual stress, secure a stress relaxing layer, and extend the service life of the barrel.

A barrel in a second embodiment according to the present invention for a two screw extruder will be described with reference to FIG. 3, in which the description of parts like or corresponding to those of the barrel in the first embodiment will be omitted.

Figure 3:
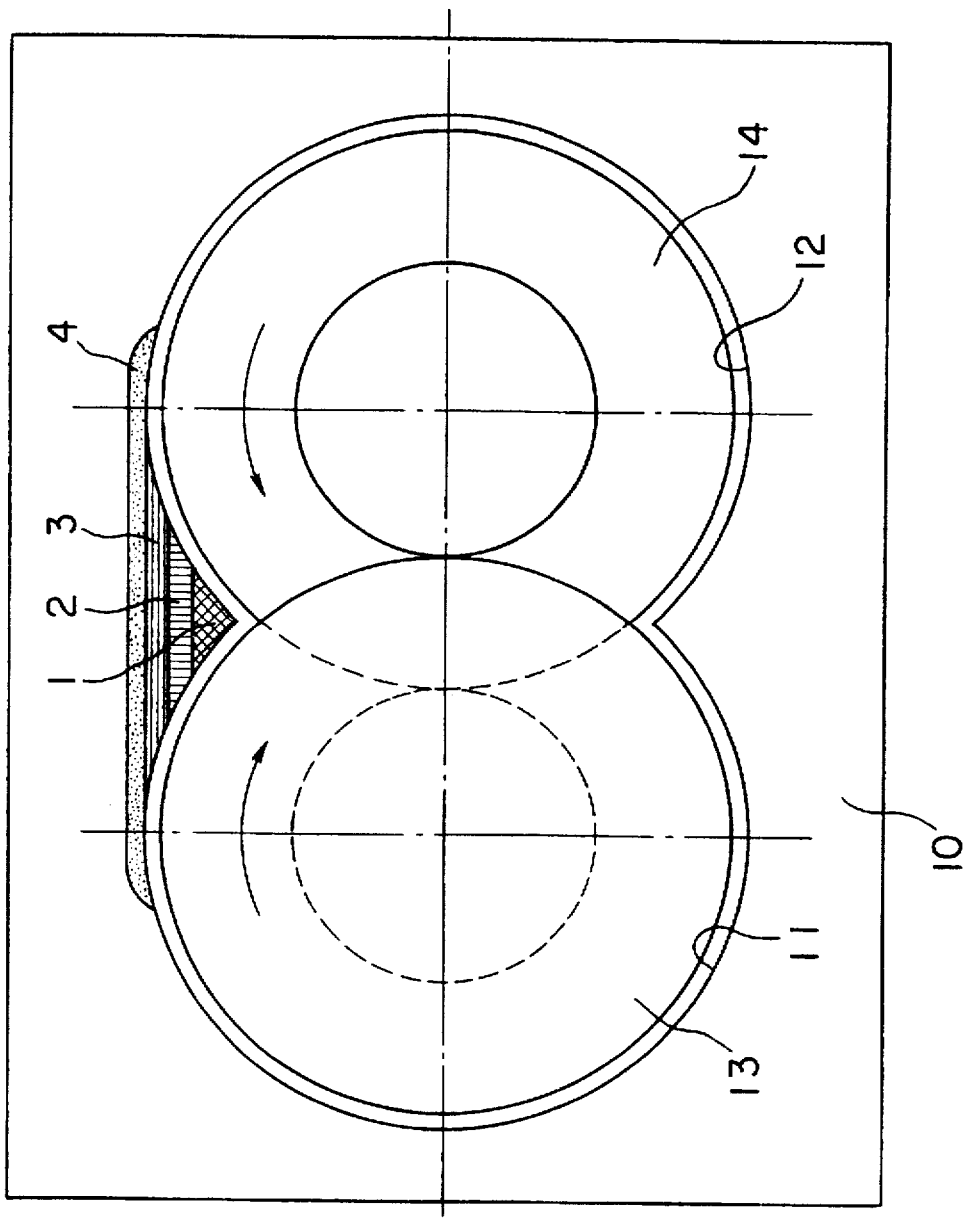
FIG. 3 is a sectional view of a barrel in a second embodiment according to the present invention for a twin screw extruder.

Referring to FIG. 3, the barrel has a barrel body 10 provided with two partly overlapping cylindrical bores 11 and 12. An abrasion resistant layer 1 is formed in portions of the surfaces of the cylindrical bores 11 and 12 around an upper line of intersection, as viewed in FIG. 3, of the cylindrical bores 11 and 12, and abrasion resistant layers 2, 3 and 4 are superposed in that order under the abrasion resistant layer 1. As shown in FIG. 3, the opposite side surfaces of the abrasion resistant layer 1, the opposite side surfaces of the abrasion resistant layers 2 and 3, and the inner surfaces of the opposite side portions of the abrasion resistant layer 4 are exposed and form portions of the surfaces of the cylindrical bores 11 and 12. The abrasion resistant layer 1 has the highest abrasion resistance, and the abrasion resistances of the abrasion resistant layers 2, 3 and 4 are graded in decreasing order of the abrasion resistant layers 2, 3 and 4.

The hard substance contents of the materials forming the abrasion resistant layers 1, 2, 3 and 4, similarly to those of the materials forming the abrasion resistant layers 1, 2, 3 and 4 of the first embodiment, are graded in decreasing order of the abrasion resistant layers 1, 2, 3 and 4. The abrasion resistant layers 1, 2, 3 and 4 are characterized by high abrasion resistance, high toughness and high abrasion resistance, high toughness, and abrasion resistance, respectively. More concretely, the abrasion resistant layers 1, 2, 3 and 4 are formed by depositing materials respectively having different hard substance contents decreasing in the order of the abrasion resistant layers 1, 2, 3 and 4 by build-up welding. The abrasion resistant layer 4 may be formed by depositing a material not containing any hard substance by build-up welding.

The superposed arrangement of the abrasion resistant layers 1 to 4 prevents troubles, such as peeling or flaking, perfectly.

A barrel in a third embodiment according to the present invention for a two screw extruder will be described with reference to FIG. 4, in which the description of parts like or corresponding to those of the barrel in the first and the second embodiment will be omitted. The third embodiment is intended to provide a barrel with a corrosion resistant property in addition to an abrasion resistant property.

Figure 4:
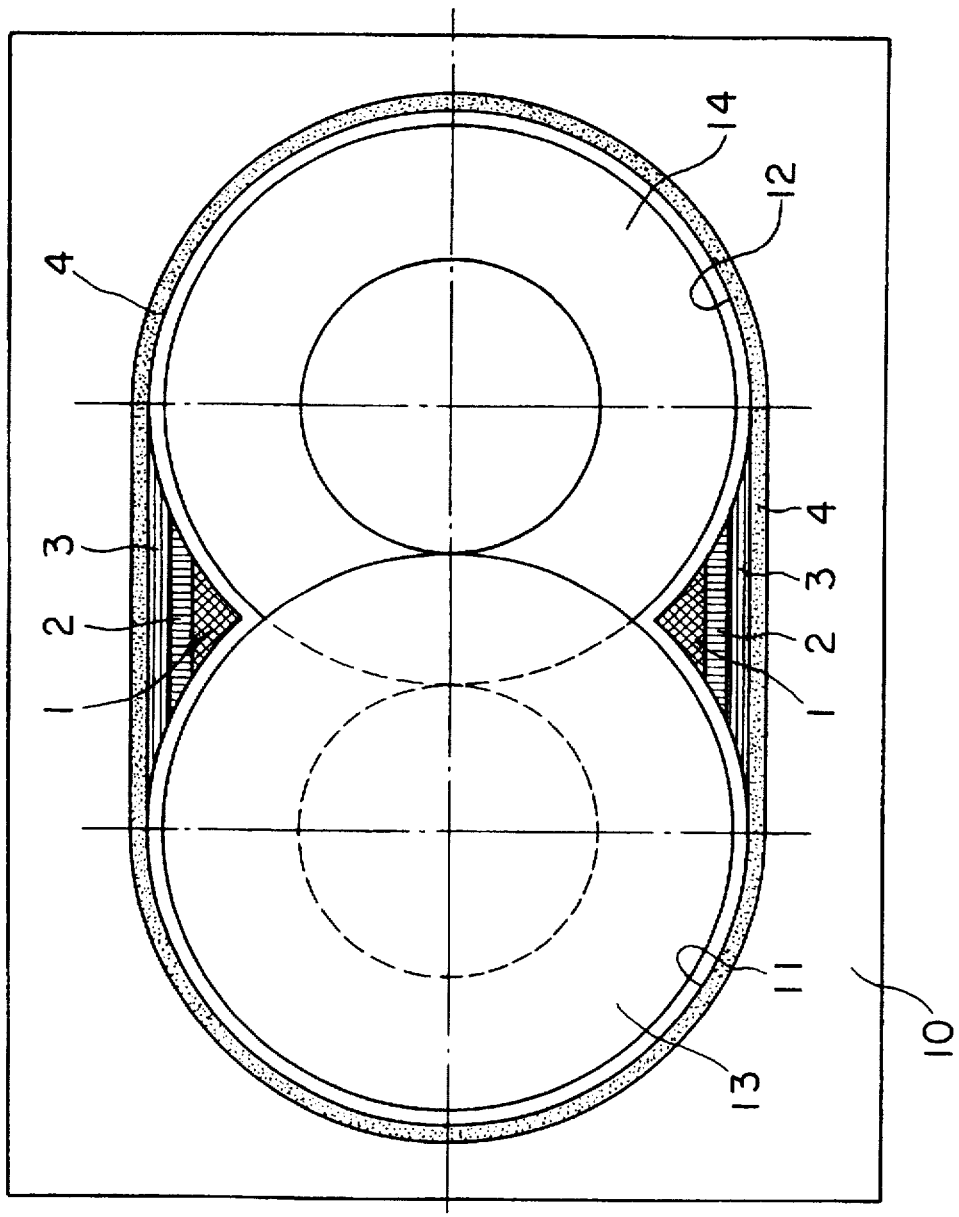
FIG. 4 is a sectional view of a barrel in a third embodiment according to the present invention for a twin screw extruder.

Referring to FIG. 4, the barrel has a barrel body 10 provided with two partly overlapping cylindrical bores 11 and 12. As shown in FIG. 4, an abrasion resistant layer 4 of a material not containing any hard substance is formed on the entire surfaces of the two partly overlapping cylindrical bores 11 and 12, and abrasion resistant layers 1, 2 and 3 are formed in portions of the surfaces of the cylindrical bores 11 and 12 in the vicinity of both an upper and a lower line of intersection of the cylindrical bores 11 and 12. The abrasion resistant layer 1 has the highest abrasion resistance, and the abrasion resistances of the abrasion resistant layers 2, 3 and 4 are graded in decreasing order of the abrasion resistant layers 2, 3 and 4.

The abrasion resistant layers 1, 2, 3 and 4 are characterized by high abrasion resistance, high toughness and high abrasion resistance, high toughness, and abrasion resistance, respectively. More concretely, the abrasion resistant layers 1, 2 and 3 are formed by depositing materials respectively having different hard substance contents decreasing in order of the abrasion resistant layers 1, 2 and 3 by build-up welding. The abrasion resistant layer 4 is formed by depositing a material not containing any hard substance by build-up welding.

EXAMPLES OF FIRST EMBODIMENT AND COMPARATIVE EXAMPLE

Barrels in Examples 1 to 6 of the first embodiment and in Comparative example 1 will be described with reference to FIGS. 1 and 2, and Tables 1 and 2. Examples 1 to 6 correspond in construction to the barrel in the first embodiment.

Table 1 shows the materials of the barrel bodies 10 and the abrasion resistant layers 1 to 4. The surfaces of the cylindrical bores of Comparative example 1 was treated only by nitriding and was not provided with any abrasion resistant layers. The barrel bodies 10 of the barrels in Examples 1 to 6 and Comparative example 1 were made of SACM645, JIS. The abrasion resistant layers 1 to 3 of Examples 1 and 3 were formed by depositing a Co—Cr—Mo alloy, i.e., a base alloy, containing VC, i.e., a hard substance, of 1 to 10 μm in grain size in different VC contents, respectively. The abrasion resistant layers 1 to 3 of Examples 2 and 4 were formed by depositing a Ni—Cr—Mo alloy, i.e., a base alloy, containing VC, i.e., a hard substance of 1 to 10 μm in grain size in different VC contents, respectively. The abrasion resistant layers 1 to 3 of Example 5 were formed by depositing a Co—Cr—Mo alloy, i.e., a base alloy, containing NbC, a hard substance, of 1 to 10 μm in grain size in different NbC contents, respectively. The abrasion resistant layers 1 to 3 of Example 6 were formed by depositing a Ni—Cr—Mo alloy, i.e., a base alloy, containing NbC, i.e., a hard substance, of 1 to 10 μm in grain size in different NbC contents, respectively. The abrasion resistant layers 4 of Examples 1, 3 and 5 were formed by depositing the Co—Cr—Mo alloy not containing any hard substance, and those of Examples 2, 4 and 6 were formed by depositing the Ni—Cr—Mo not containing any hard substance. Table 2 shows the compositions of the Co—Cr—Mo alloy and the Ni—Cr—Mo alloy.

The abrasion resistant layers 1 to 4 were formed in a thickness of 2 mm by depositing the base alloys containing the hard substances in layers by TIG welding (tungsten-inert gas welding) and machining the deposited layers. The hardnesses of the abrasion resistance layers 1 to 4 were in the range of 35 to 60 Rockwell C.

The barrels in Examples 1 to 6 and Comparative example 1 were tested for durability on a two screw extruder, in which a material containing a synthetic resin and 30% glass fibers was mixed. In Table 1, "specific durability" signifies the service life of the barrel normalized by that of the barrel in Comparative example 1. As is obvious from Table 1, the abrasion resistance of the barrels in Examples 1 to 6 corresponding to the first embodiment is far higher than that of the barrel in Comparative example 1. The adjacent abrasion resistant layers 1 to 4 were metallurgically bonded together and to the barrel bodies 10 and troubles, such as peeling or flaking, did not occur at all.

TABLE 1

| Ex. No. | Barrel Body | Base Alloy | Material | Abrasion Resistant Layer | Content (wt. %) | Specific Durability |
|---|---|---|---|---|---|---|
| Ex. 1 | SACM645 | Co—Cr—Mo | VC | 1 | 30% | 2.7 |
| | | | | 2 | 20% | |
| | | | | 3 | 10% | |
| | | | | 4 | 0% | |
| Ex. 2 | SACM645 | Ni—Cr—Mo | VC | 1 | 30% | 2.0 |
| | | | | 2 | 20% | |
| | | | | 3 | 10% | |
| | | | | 4 | 0% | |
| Ex. 3 | SACM645 | Co—Cr—Mo | VC | 1 | 35% | 2.8 |
| | | | | 2 | 25% | |
| | | | | 3 | 15% | |
| | | | | 4 | 0% | |
| Ex. 4 | SACM645 | Ni—Cr—Mo | VC | 1 | 35% | 3.0 |
| | | | | 2 | 25% | |
| | | | | 3 | 15% | |
| | | | | 4 | 0% | |
| Ex. 5 | SACM645 | Co—Cr—Mo | NbC | 1 | 30% | 2.5 |
| | | | | 2 | 20% | |
| | | | | 3 | 10% | |
| | | | | 4 | 0% | |
| Ex. 6 | SACM645 | Ni—Cr—Mo | NbC | 1 | 35% | 3.0 |
| | | | | 2 | 25% | |
| | | | | 3 | 15% | |
| | | | | 4 | 0% | |
| Comp. Ex. 1 | SACM645 | nitriding only | — | — | — | 1.0 |

TABLE 2

| Base Alloy | Composition (wt. %) | | | | | | |
|---|---|---|---|---|---|---|---|
| | Co | Ni | Cr | Mo | C | B | Si |
| Co—Cr—Mo | Bal. | — | 9 | 10 | — | 3 | 1.0 |
| Ni—Cr—Mo | — | Bal. | 13 | 6 | 0.1 | 3 | 2 |

EXAMPLES OF SECOND EMBODIMENT AND COMPARATIVE EXAMPLE

Barrels in Examples 7 to 12 of the second embodiment and in Comparative example 1 will be described with reference to FIG. 3 and Tables 2 and 3. Examples 7 to 12 correspond in construction to the barrel in the second embodiment.

The barrels in Examples 7 to 12 and Comparative example 1 were tested under the same conditions as those under which the barrels in Examples 1 to 6 of the first embodiment were tested. The materials of the barrel bodies 10 and the abrasion resistant layers 1 to 4, and test results are shown in Table 3. As is obvious from Table 3, Examples 7 to 12 of the second embodiment were substantially the same in durability and abrasion resistance as Examples 1 to 6 of the first embodiment. The superposed arrangement of the abrasion resistant layers 1 to 4 prevented troubles, such as peeling or flaking, perfectly.

EXAMPLES OF THIRD EMBODIMENT AND COMPARATIVE EXAMPLE

Barrels in Examples 13 to 18 of the third embodiment and in Comparative example 2 will be described with reference to FIG. 4 and Table 4. Examples 13 to 18 correspond in construction to the barrel in the third embodiment. Table 4 shows the materials of the barrel bodies 10 in Examples 13 to 18 and Comparative example 2, and the compositions of the materials of the abrasion resistant layers 1 to 4 in Examples 13 to 18. Comparative example 2 is identical in all respects with Comparative example 1.

The base alloys of the abrasion resistant layers 1 to 4 of the barrels in Examples 13 to 16 are Co—Cr—Mo alloys, and the base alloys of the abrasion resistant layers 1 to 4 in Examples 17 and 18 are Ni—Cr—Mo alloys. These base alloys contain Cu to reduce potential difference, and Fe to enhance shock resistance. As is obvious from comparative observation of Tables 2 and 4, these base alloys, as compared with the base alloys employed in Examples 1 to 6, have an increased Cr content to improve nitric acid resistance, and an increased Mo content to improve hydrofluoric acid resistance. Tungsten (W) is added to the base alloys employed in Examples 13 to 15 as an element to enhance the temper resistance of the base alloys rather than as an element to produce carbides.

The barrels in Examples 13 to 18 of the third embodiment and Comparative example 2 were tested on a two screw extruder which was operated to mix and extrude a material consisting of ABS monomer, a catalyst and a solvent. Test results are shown in Table 4. As is obvious from Table 4, the barrels in Examples 13 to 18 of the third embodiment are superior in corrosion resistance to the barrel in Comparative example 2, and have greatly extended service life. In Table 4, "specific durability" signifies the service life of the barrel normalized by that of the barrel in Comparative example 2.

TABLE 3

| Ex. No. | Barrel Body | Base Alloy | Material | Abrasion Resistant Layer | Hard Substance Content (wt. %) | Specific Durability |
|---|---|---|---|---|---|---|
| Ex. 7 | SACM645 | Co—Cr—Mo | VC | 1 | 30% | 2.5 |
|  |  |  |  | 2 | 20% |  |
|  |  |  |  | 3 | 10% |  |
|  |  |  |  | 4 | 0% |  |
| Ex. 8 | SACM645 | Ni—Cr—Mo | VC | 1 | 30% | 2.0 |
|  |  |  |  | 2 | 20% |  |
|  |  |  |  | 3 | 10% |  |
|  |  |  |  | 4 | 0% |  |
| Ex. 9 | SACM645 | Co—Cr—Mo | VC | 1 | 35% | 2.8 |
|  |  |  |  | 2 | 25% |  |
|  |  |  |  | 3 | 15% |  |
|  |  |  |  | 4 | 0% |  |
| Ex. 10 | SACM645 | Ni—Cr—Mo | VC | 1 | 35% | 3.0 |
|  |  |  |  | 2 | 25% |  |
|  |  |  |  | 3 | 15% |  |
|  |  |  |  | 4 | 0% |  |
| Ex. 11 | SACM645 | Co—Cr—Mo | NbC | 1 | 30% | 2.5 |
|  |  |  |  | 2 | 20% |  |
|  |  |  |  | 3 | 10% |  |
|  |  |  |  | 4 | 0% |  |
| Ex. 12 | SACM645 | Ni—Cr—Mo | NbC | 1 | 35% | 2.8 |
|  |  |  |  | 2 | 25% |  |
|  |  |  |  | 3 | 15% |  |
|  |  |  |  | 4 | 0% |  |
| Comp. Ex. 1 | SACM645 | nitriding only | — | — | — | 1.0 |

TABLE 4

| Barrel No. | Body | Composition of Base Alloy (wt. %) | | | | | | | | | Hard Substance | | Content (wt. %) | Specific Durability |
|---|---|---|---|---|---|---|---|---|---|---|---|---|---|---|
|  |  | Co | Ni | Cr | Mo | C | B | Si | W | Cu | Fe | Material | Layer | | |
| Ex. 13 | SCM435 | bal. | — | 22 | 17 | 0.5 | 3 | 1.5 | 10 | 0.6 | 1.5 | VC | 1 | 35 | 3.1 |
|  |  |  |  |  |  |  |  |  |  |  |  |  | 2 | 25 |  |
|  |  |  |  |  |  |  |  |  |  |  |  |  | 2 | 15 |  |
|  |  |  |  |  |  |  |  |  |  |  |  |  | 2 | 0 |  |
| Ex. 14 | SCM435 | bal. | — | 15 | 16 | 0.5 | 3 | 2.3 | 17 | 0.7 | 1.8 | VC | 1 | 35 | 2.8 |
|  |  |  |  |  |  |  |  |  |  |  |  |  | 2 | 25 |  |
|  |  |  |  |  |  |  |  |  |  |  |  |  | 2 | 15 |  |
|  |  |  |  |  |  |  |  |  |  |  |  |  | 2 | 0 |  |
| Ex. 15 | SCM435 | bal. | — | 22 | 15 | 0.1 | 2.5 | 1.1 | 4.5 | 0.5 | 2.9 | VC | 1 | 35 | 2.0 |
|  |  |  |  |  |  |  |  |  |  |  |  |  | 2 | 25 |  |
|  |  |  |  |  |  |  |  |  |  |  |  |  | 2 | 15 |  |
|  |  |  |  |  |  |  |  |  |  |  |  |  | 2 | 0 |  |
| Ex. 16 | SCM435 | bal. | — | 21 | 16 | — | 3 | 1.75 | — | 0.7 | 2.5 | VC | 1 | 35 | 2.5 |
|  |  |  |  |  |  |  |  |  |  |  |  |  | 2 | 25 |  |
|  |  |  |  |  |  |  |  |  |  |  |  |  | 2 | 15 |  |
|  |  |  |  |  |  |  |  |  |  |  |  |  | 2 | 0 |  |
| Ex. 17 | SCM435 | — | bal. | 22 | 17 | 0.2 | 3 | 1.7 | — | 1 | 1 | VC | 1 | 35 | 2.8 |
|  |  |  |  |  |  |  |  |  |  |  |  |  | 2 | 25 |  |
|  |  |  |  |  |  |  |  |  |  |  |  |  | 2 | 15 |  |
|  |  |  |  |  |  |  |  |  |  |  |  |  | 2 | 0 |  |
| Ex. 18 | SCM435 | — | bal. | 15 | 16 | 0.1 | 3 | 1.0 | — | 0.5 | 2 | VC | 1 | 35 | 2.4 |
|  |  |  |  |  |  |  |  |  |  |  |  |  | 2 | 25 |  |
|  |  |  |  |  |  |  |  |  |  |  |  |  | 2 | 15 |  |
|  |  |  |  |  |  |  |  |  |  |  |  |  | 2 | 0 |  |
| Comp Ex. 2 | SACM645 | nitriding only | | | | | | | | | | — | — | — | 1.0 |

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A barrel for a twin screw extruder comprising:
   a barrel body having first and second cylindrical bores partly overlapping along two lines of intersection therein;
   a first helical screw rotatably supported in the first cylindrical bore of the barrel body;
   a second helical screw rotatably supported in the second cylindrical bore of the barrel body; and
   an abrasion resistant layer formed on surfaces of the first and second cylindrical bores such that the abrasion resistant layer has a maximum abrasion resistance adjacent to at least one of the two lines of intersection and the abrasion resistance gradually decreases with distance from at least one of the two lines of intersection.

2. The barrel for a twin screw extruder according to claim 1, wherein the abrasion resistant layer is formed by depositing a material containing a hard substance by build-up welding, and the hard substance content of the material in the abrasion resistant layer is gradually decreased with distance from at least one of the two lines of intersection.

3. The barrel for a twin screw extruder according to any of claims 1 or 2, wherein the abrasion resistant layer is formed by depositing a material consisting of a corrosion resistant base alloy and a hard substance.

4. The barrel for a twin screw extruder according to claim 1 wherein the barrel body comprises a plurality of layers of a material containing a hard substance wherein the plurality of layers is disposed in the barrel body such that opposite ends of each layer are exposed on the surfaces of the first and second cylindrical bores; and
   the hard substance content of each layer is such that the layer with the greatest hard substance content is disposed on at least one of the two lines of intersection and the hard substance content of the plurality of layers is gradually decreased with distance from at least one of the two lines of intersection such that the abrasive resistance of the abrasion resistant layer gradually decreases with distance from at least one of the two lines of intersection.

5. The barrel for a twin screw extruder according to claim 4 wherein the barrel body further comprise a layer of a corrosive resistant base alloy, wherein the corrosive base alloy is disposed in the barrel body such that it is exposed on a portion of the surfaces of the first and second cylindrical bores; and the plurality of layers of a material containing a hard substance is disposed adjacent to the layer of a corrosion resistant base alloy.

* * * * *